April 14, 1970 B. GREENLAW 3,506,047
APPARATUS FOR EXTRACTING CITRUS OIL FROM CITRUS FRUIT
Filed Nov. 15, 1967 2 Sheets-Sheet 1

INVENTOR.
Billie Greenlaw
BY
Attorneys

April 14, 1970　　　　　B. GREENLAW　　　　　3,506,047
APPARATUS FOR EXTRACTING CITRUS OIL FROM CITRUS FRUIT
Filed Nov. 15, 1967　　　　　　　　　　　　2 Sheets-Sheet 2

INVENTOR.
Billie Greenlaw
BY
Attorneys

United States Patent Office 3,506,047
Patented Apr. 14, 1970

3,506,047
APPARATUS FOR EXTRACTING CITRUS OIL FROM CITRUS FRUIT
Billie Greenlaw, 1 Snowberry Lane,
Orinda, Calif. 94563
Filed Nov. 15, 1967, Ser. No. 683,267
Int. Cl. A23n *15/02*
U.S. Cl. 146—226                  3 Claims

ABSTRACT OF THE DISCLOSURE

A process for removing citrus oil from citrus fruit wherein the fruit is vibrated on a bed containing a plurality of pins. The pins are disposed to pierce the oil cells of the fruit, and the liberated oil from the ruptured cells is removed by a water bath.

BACKGROUND OF THE INVENTION

The present invention relates to a method for extracting oil from the flavedo layer of citrus fruit. The oil contained in the oil cells located in the flavedo layer of the citrus fruit is a valuable product, providing it can be recovered without heating and without darkening or oxidizing the oil. The oil is an especially valuable by-product of citrus fruit that is being processed for juice or canned. As used, the term citrus fruit refers to lemon, orange, grapefruit, lime, tangerine, and like fruits.

In the past, the citrus oil or peel oil as it is referred to has been removed and recovered by various methods, none of which have been entirely satisfactory. For example, the peel of the fruit after the juice was extracted has been pressed to remove the oil. While this approach recovers a portion of the oil, it also liberates considerable pectin and other undesirable products of the peel contained in the albedo layer of the fruit. Further, if the oil is not removed until after the juice is extracted, a considerable amount of the oil is liberated during the juice-extraction process and is either lost or contaminates the juice, which lowers the quality of the juice.

Another method that has been used in the past consists of shaving the flavedo layer from the peel after extracting the juice and then pressing the shavings. This method recovers slightly more oil, but is not much more efficient than screw presses.

A variation of the method in which the flavedo layer is shaved from the fruit consists of scratching or abrading the flavedo layer away in an effort to liberate the peel oil. This, again, creates the possibility of considerable pectin and other albedo layer derivatives contaminating the liberated oil and reduces the quality of the oil. Further, the method in which the layer is scratched or abraded away tends to darken and oxidize the oil, which reduces its quality.

A still further method consists of removing both the juice and the oil in one continuous squashing motion. In this method the juice is removed through a perforated tube that pierces the fruit and then further deformation by squashing the peel removes a part of the oil. Again this method suffers from liberating considerable pectin and other undesirable derivatives from the albedo layer of the fruit. Because present methods are somewhat violent causing air turbulence during rupture of the oil cells, much oil is lost by volatilization into the atmosphere. Also a portion of the liberated oil contaminates the juice and reduces its quality. None of the present methods of recovering citrus oils recovers more than 75% of the total oil available and in industry practice 65% recovery is considered good.

SUMMARY OF THE INVENTION

The present invention would solve the above problems by providing a method of liberating up to 95% of oil present in the flavedo layer, and for recovering the citrus or peel oil from the outer surface of the citrus fruit without disturbing the inner or albedo layer of the fruit. The oil is removed prior to processing the fruit for juice and thus the juice is not contaminated with excessive oil during extraction of the juice. The method consists of vibrating or gently bouncing the fruit on a bed of vertical pins. The pins puncture the outer or flavedo layer of the fruit and rupture the oil cells to liberate the oil. The oil is then recovered by means of a water bath that washes away the oil to form a water-oil emulsion. The oil is then recovered from the water-oil emulsion by various means, as for example, a centrifugal extraction process.

In addition to gently bouncing the fruit over the bed of vertical pins, the method also incorporates means for causing the fruit to slowly traverse the bed of vertical pins. Thus, the process is a continuous process with the fruit being supplied to the bed at one end and removed at the opposite end. The speed or progress of the fruit along the bed is controlled so that substantially all of the oil is liberated prior to the discharge of the fruit from the process. The oil that is liberated is recovered by means of the water bath which, as explained above, forms a water-oil emulsion. Since the oil is lighter than the water, it is possible to skim a concentrated water-oil emulsion from the surface of the water bath. This reduces the amount of processing necessary to recover the oil from the emulsion.

Since the peel of the fruit is not abraded or otherwise destroyed during the oil extraction process, further processing of the fruit can use any desired method. Thus, if the juice is to be extracted this can be done by any well-known method. Similarly, if the fruit is to be canned, any conventional peeling and canning process may be employed.

BRIEF DESCRIPTION OF THE DRAWINGS

The above advantages of this invention will be more easily understood from the following description of a preferred embodiment when taken in conjunction with the attached drawing, in which.

DESCRIPTION OF A PREFERRED EMBODIMENT OF THE INVENTION

Figure 1:
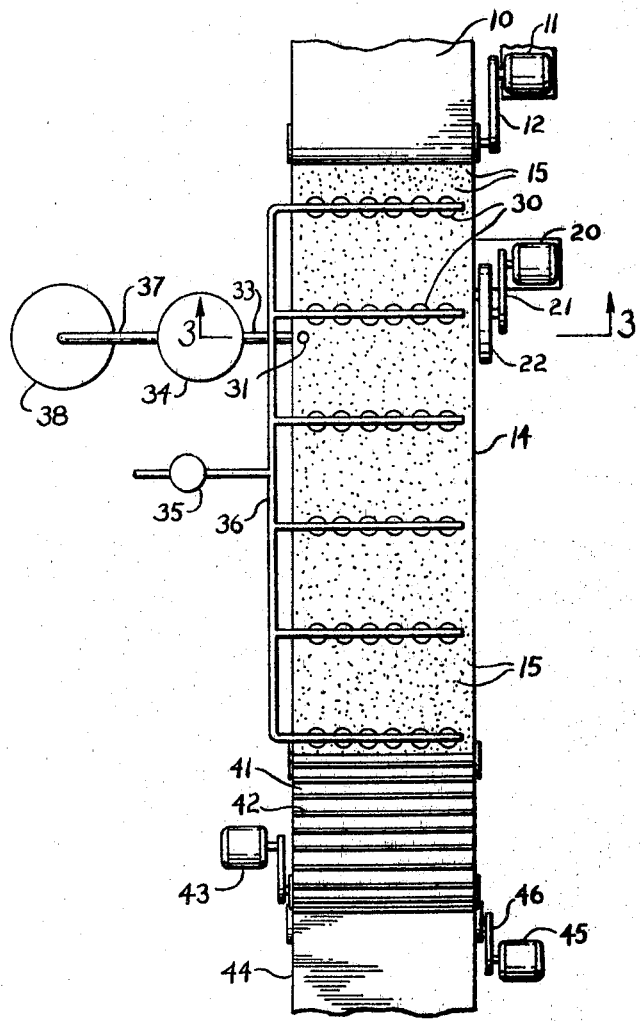
FIGURE 1 is a plan view of an apparatus suitable for carrying out the method of this invention.
Figure 2:
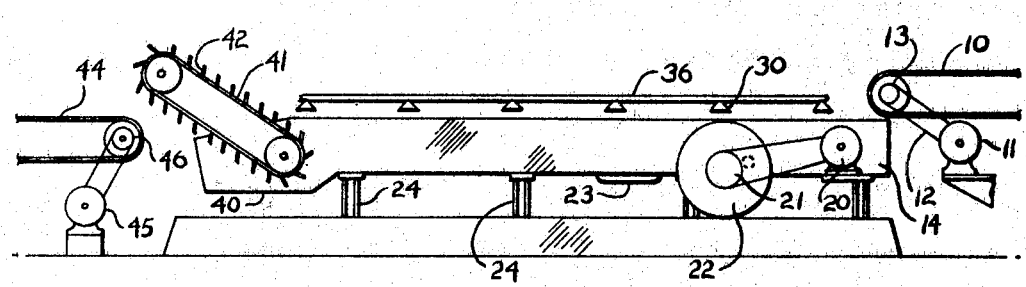
FIGURE 2 is an elevational view of the apparatus shown in FIGURE 1.
Figure 3:
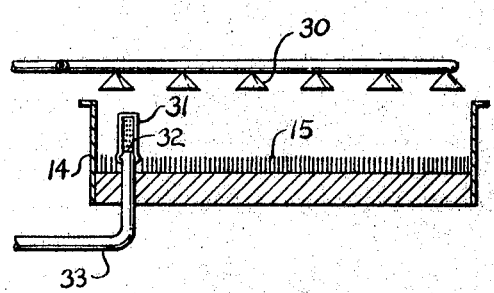
FIGURE 3 is a partial vertical section taken along line 3—3 of FIGURE 1 showing the weir means used to control the level of the water bath in the apparatus.

Referring now to FIGURES 1, 2 and 3, there is shown an apparatus suitable for carrying out the method and process of this invention. More particularly, there is shown a supply conveyor 10 that continuously supplies fresh fruit to the extraction apparatus of this invention. The conveyor 10 is driven by a motor 11 through a belt arrangement 12 that couples the motor to the drive pulley 13 of the conveyor. The fruit from the end of the conveyor 10 falls onto a horizontal bed 14 containing a plurality of vertically positioned pins 15. The pins 15 should be placed on the order of an eighth of an inch to three-eights of an inch apart and may have a length on the order of a thirty-second of an inch to an inch or more. The vertical pins are provided with relatively sharp pointed ends to easily pierce the flavedo layer of the fruit. There must be a sufficient number of pins to completely extract the oil from the fruit as it passes along the horizontal bed.

The horizontal bed is vibrated in horizontal and vertical planes by a drive motor 20 that is coupled by a belting arrangement and pulley 21 to an eccentric drive means 22. The eccentric drive 22 could be replaced by other means for vibrating the table in a horizontal direction, for example a conventional crank and connecting rod arrangement could also be used. The table is vibrated in a horizontal direction to cause the fruit to be conveyed from one end of the horizontal bed to the opposite. In addition to the horizontal vibration of the table, the table is vibrated in a vertical direction to cause the fruit to gently bounce or vibrate on the vertical pins. The vertical vibration of the table may be provided by a mechanical vibrator 23 that is coupled directly to the bottom of the horizontal bed. This vibrator may take various forms, for example an eccentric drive means may be used or an electromechanical transducer can be used to gently vibrate the table. The important feature of the vertical vibration is that it be sufficient to cause the fruit to gently bounce on the horizontal bed, but not of sufficient magnitude to damage the fruit or cause the pins to penetrate beyond the flavedo layer of the fruit. Normally, the fruit can be vibrated from a fraction of an inch to approximately four inches without serious problems arising. The horizontal bed 14 is supported on a base member by means of flexible or spring-like legs 24. The spring-like legs should have sufficient movement to permit the horizontal vibrating of the table yet retain the table firmly in place. Obviously, other types of mounting means can also be used for mounting the horizontal bed, providing the mounting means has sufficient freedom to permit horizontal vibrating of the table.

The oil that is liberated by the pins piercing the oil cells of the fruit is washed from the fruit by means of a plurality of spray heads 30 positioned atop of the horizontal bed. The spray heads are supplied with water by means of a pump means 35 and a distribution line 36. It should be noted that one set of spray heads 30 are located immediately adjacent the end of the table from which the fruit is removed. This insures that all of the liberated oil is washed from the fruit prior to the removal of the fruit from the bed.

The water-oil emulsion is removed from the table through a weir type connection 31. The top 32 of the weir is positioned to maintain the water levels approximately at the level of the top of the pins. The water level can be slightly above or below the top of the pins depending upon the particular fruit being processed, as well as the ripeness or condition of the fruit being processed. The weir is connected by a conduit 33 to a storage tank 34 where the oil-water emulsion may be stored. The storage tank 34 is connected by a line 37 to a separating means 38 that may take various forms, as for example, a centrifugal separating means.

The fruit after traveling the length of the horizontal bed is collected in a depressed or collecting portion 40 of the bed. The fruit is then removed from the portion 40 of the bed by means of a conveyor 41 having a plurality of horizontal members 42 disposed thereon. The horizontal members 42 lift the fruit from the bottom of the collecting portion 40 and convey it upwardly and discharge it onto a horizontal conveyor 44. The conveyor 41 is driven by means of a motor 43 which may include a suitable speed reduction, not shown. The horizontal conveyor 44 is driven by means of a motor 45, and a belting arrangement 46 and serves to convey the fruit to the next processing station.

OPERATION OF THE INVENTION

Figure 4:
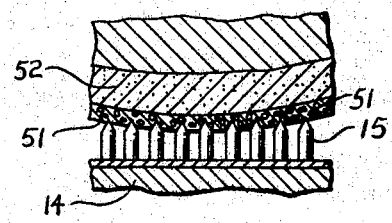
FIGURE 4 is a partial section drawn to an enlarged scale showing a portion of a fruit and the operation of the invention.

The operation of the invention can be more easily understood by referring to FIGURE 4 where there is shown a portion of the fruit drawn to an enlarged scale and the vertical pins 15. As explained above, the fruit is discharged onto a horizontal bed 14 which is vibrated both in a horizontal and a vertical direction. As explained, the vertical vibration should be controlled so that the fruit vibrates or bounces from a fraction of an inch to approximately 4 inches. The vertical bouncing of the fruit causes the pins to pierce or rupture the oil cells 51 located in the flavedo layer of the fruit as the fruit lands on the sharp ends of the pins 15. When the oil cells are ruptured, the citrus oil will be liberated and tend to flow to the outer surface of the peel. As shown in FIGURE 4, the sharpened ends of the pins rupture of oil cells, but do not penetrate the albedo layer 52 of the fruit. Thus, while the citrus oil from the oil cells is liberated, the undesirable pectin and other derivatives of the albedo layer are not disturbed. As the fruit is being vibrated or bounced vertically on the horizontal table, the sprays and spray heads 30 will wash the liberated oil from the surface of the peel of the fruit. As the oil is washed from the surface, it will form an oil-water emulsion that is removed through the weir member 31. Since the citrus oil is lighter than water, it will tend to rise and float on the surface of the water. Thus, since the level of the water is determined by the height of the top of the weir 32, only a concentrated emulsion of oil in water will be removed through the weir means 31. The oil-water emulsion, as removed can then be separated, as for example, in a conventional centrifuge, with a portion of the water being returned to the apparatus, if so desired.

After the oil is removed from the fruit, the fruit is discharged from the apparatus and placed on a conveyor in order that it may travel to the next processing station.

From the above description, it is seen that the fruit is not physically damaged by the extraction process of this invention, nor is the outer peel of the skin destroyed. Thus, the fruit can be conveyed to further processing stations using any desired processing method. Further, since the citrus oil is removed before the juice is extracted from the fruit, the juice can be extracted without the danger of contaminating it with citrus oil. Likewise, the oil that is removed will not be contaminated with the pectin and other undesirable derivatives of the albedo layer or a portion of the fruit itself. Thus, both the quality of the citrus oil and the quality of the juice that is extracted from the fruit is improved by the process and apparatus of this invention.

While a mechanical means has been shown for vibrating the table in both the vertical and horizontal planes, obviously other vibrating means may be substituted. Likewise, other arrangements of vertical pins are also possible. As explained above, the only requirement for the pins is that they be of sufficient number to rupture virtually all of the oil cells in the fruit as it moves along the horizontal bed and that they are positioned so that they only pierce the flavedo layer of the fruit. This may be accomplished by placing pins on ⅛ to ⅜ centers having them of a relatively uniform length on the order of $\frac{1}{32}$ to an inch or more.

It should be understood that the pins 15, while of sufficient sharpness to freely penetrate the flavedo layer of the fruit, are preferably not of a narrow, thin, or needle-like configuration, since the latter perform a puncturing operation, but upon pin withdrawal the peel tends to close up and prevent the egress of the oil. Thus, the pins may have a general square cross-section at their ends, although of a tapered shape to prevent the puncture sealing effect of a needle-like pin.

What is claimed is:

1. A process for extracting the peel oil from citrus fruit, providing a generally planar horizontally extending bed having closely positioned pointed elements extending upwardly therefrom, depositing the fruit on said bed, vibrating said bed in a vertical direction to cause said fruit to bounce on said pointed elements and effect a clean piercing of the fruit thereby in a generally vertical direction along a diameter of the fruit, and limiting the entry of said pointed elements into said fruit to the approximate depth of the flavedo layer of said fruit to rupture the oil-bearing cells without penetration of the albedo layer thereof.

2. A process as set forth in claim 1 including moving said fruit along said bed until substantially all of the oil-bearing cells in the flavedo layer of said fruit are pierced.

3. A process as set forth in claim 1 in which water is sprayed over said bed and the fruit deposited thereon, and such water is maintained on said bed to substantially the height of the pointed elements.

References Cited

UNITED STATES PATENTS

| | | | |
|---|---|---|---|
| 2,527,364 | 10/1950 | Koffler | 146—3 |
| 2,529,286 | 11/1950 | Fraser | 146—3 |
| 3,078,890 | 2/1963 | Behnke | 146—56 |

W. GRAYDON ABERCROMBIE, Primary Examiner

U.S. Cl. X.R.

146—3, 56